(12) United States Patent
Shea

(10) Patent No.: US 7,802,840 B1
(45) Date of Patent: Sep. 28, 2010

(54) TRACTOR CAB BED APPARATUS

(76) Inventor: Christopher R. Shea, P.O. Box 777, Dennisport, MA (US) 02639

( * ) Notice: Subject to any disclaimer, the term of this patent is extended or adjusted under 35 U.S.C. 154(b) by 152 days.

(21) Appl. No.: 11/694,152

(22) Filed: Mar. 30, 2007

(51) Int. Cl.
*B60J 7/00* (2006.01)

(52) U.S. Cl. .............................. 296/190.02

(58) Field of Classification Search ........... 296/190.02, 296/190.01, 37.1, 26.07, 76; 292/338
See application file for complete search history.

(56) References Cited

U.S. PATENT DOCUMENTS

| | | | | |
|---|---|---|---|---|
| 593,445 | A * | 11/1897 | Toal et al. ...................... | 5/279.1 |
| 1,087,490 | A * | 2/1914 | Henry ............................ | 52/63 |
| 1,197,035 | A * | 9/1916 | Knudtson et al. ............. | 5/10.2 |
| 1,819,516 | A * | 8/1931 | Kelly ......................... | 296/37.7 |
| 2,435,755 | A * | 2/1948 | Schimpff ..................... | 186/53 |
| 2,575,189 | A * | 11/1951 | Schmidt ................... | 296/97.21 |
| 2,632,183 | A * | 3/1953 | Patton et al. ................. | 5/10.2 |
| 3,141,178 | A * | 7/1964 | Campbell .............. | 296/190.02 |
| 3,282,566 | A * | 11/1966 | Clarke ........................ | 254/122 |
| 3,310,289 | A * | 3/1967 | Burke ........................ | 254/126 |
| 3,494,656 | A * | 2/1970 | McIntire ..................... | 296/156 |
| 3,612,599 | A * | 10/1971 | Sternberg .............. | 296/190.02 |
| 3,623,168 | A * | 11/1971 | Rouch ......................... | 5/10.1 |
| 3,829,912 | A * | 8/1974 | Quakenbrush ................ | 5/10.2 |
| 4,107,797 | A * | 8/1978 | Maxwell, Sr. ................. | 5/118 |
| 4,144,601 | A * | 3/1979 | Anderson et al. ...... | 296/190.02 |
| 4,215,899 | A * | 8/1980 | Schmidt et al. ........ | 296/190.02 |
| 4,830,147 | A * | 5/1989 | Kawada ...................... | 187/205 |
| D319,807 | S | 9/1991 | Simons et al. | |
| 5,092,650 | A | 3/1992 | Perlot | |
| 5,365,622 | A * | 11/1994 | Schirmer ........................ | 5/611 |
| 5,549,051 | A * | 8/1996 | Zimmerman ................ | 292/338 |
| 5,638,559 | A | 6/1997 | Natri et al. | |
| 5,638,560 | A * | 6/1997 | Rigdon et al. .......... | 296/190.02 |
| 5,984,404 | A * | 11/1999 | Novoa et al. ........... | 296/190.02 |
| 6,231,114 | B1 * | 5/2001 | Warmoth ................ | 296/190.02 |
| 6,345,799 | B1 * | 2/2002 | Fusi ........................... | 248/320 |
| 6,405,391 | B1 | 6/2002 | Hakansson | |
| 6,493,886 | B1 * | 12/2002 | Vanpage et al. ......... | 296/190.02 |
| 6,629,322 | B1 * | 10/2003 | Monroe ........................ | 5/10.2 |
| 6,631,526 | B1 * | 10/2003 | Enright .......................... | 5/118 |
| 6,698,040 | B1 * | 3/2004 | Acevedo ....................... | 5/10.2 |
| 6,718,574 | B1 * | 4/2004 | Bradley et al. ......... | 296/190.02 |
| 6,851,376 | B2 * | 2/2005 | D'Agostino ................ | 108/42 |
| 7,178,180 | B2 * | 2/2007 | Gardner ................. | 296/190.02 |
| 2006/0242762 | A1 * | 11/2006 | Drummond et al. .... | 296/190.02 |
| 2007/0200392 | A1 * | 8/2007 | Eiswirth ................ | 296/190.02 |

* cited by examiner

*Primary Examiner*—Kiran B. Patel

(57) ABSTRACT

A tractor cab bed apparatus includes a tractor cab that has a roof with a bottom surface. A housing includes a bottom wall and a peripheral wall that is attached to and extends upwardly from the bottom wall. A mattress is positioned in the housing. The peripheral wall extends around the mattress. A support assembly is attached to the housing and secures the housing to the bottom surface of the roof. The support assembly is collapsible to position the housing in a stored position adjacent to the roof or in a deployed position has the housing spaced from the bottom surface.

4 Claims, 6 Drawing Sheets

TRACTOR CAB BED APPARATUS

BACKGROUND OF THE INVENTION

1. Field of the Invention

The present invention relates to bed devices and more particularly pertains to a new bed device for allowing a driver of a tractor cab to sleep in a tractor cab that is not equipped with a sleeper bed or does not have room behind the driver's seat for a bed.

2. Description of the Prior Art

The use of bed devices is known in the prior art. While these devices fulfill their respective, particular objectives and requirements, the need remains for a device that allows a person to sleep in a tractor cab which does not have space for a sleeper compartment. The device may use the large amount of space typically found between the top of the driver's seat and a roof of the cab to mount a bed.

SUMMARY OF THE INVENTION

The present invention meets the needs presented above by generally comprising a tractor cab that has a roof with a bottom surface. A housing includes a bottom wall and a peripheral wall that is attached to and extends upwardly from the bottom wall. A mattress is positioned in the housing. The peripheral wall extends around the mattress. A support assembly is attached to the housing and secures the housing to the bottom surface of the surface of the roof. The support assembly is collapsible to position the housing in a stored position adjacent to the roof or in a deployed position has the housing spaced from the bottom surface.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
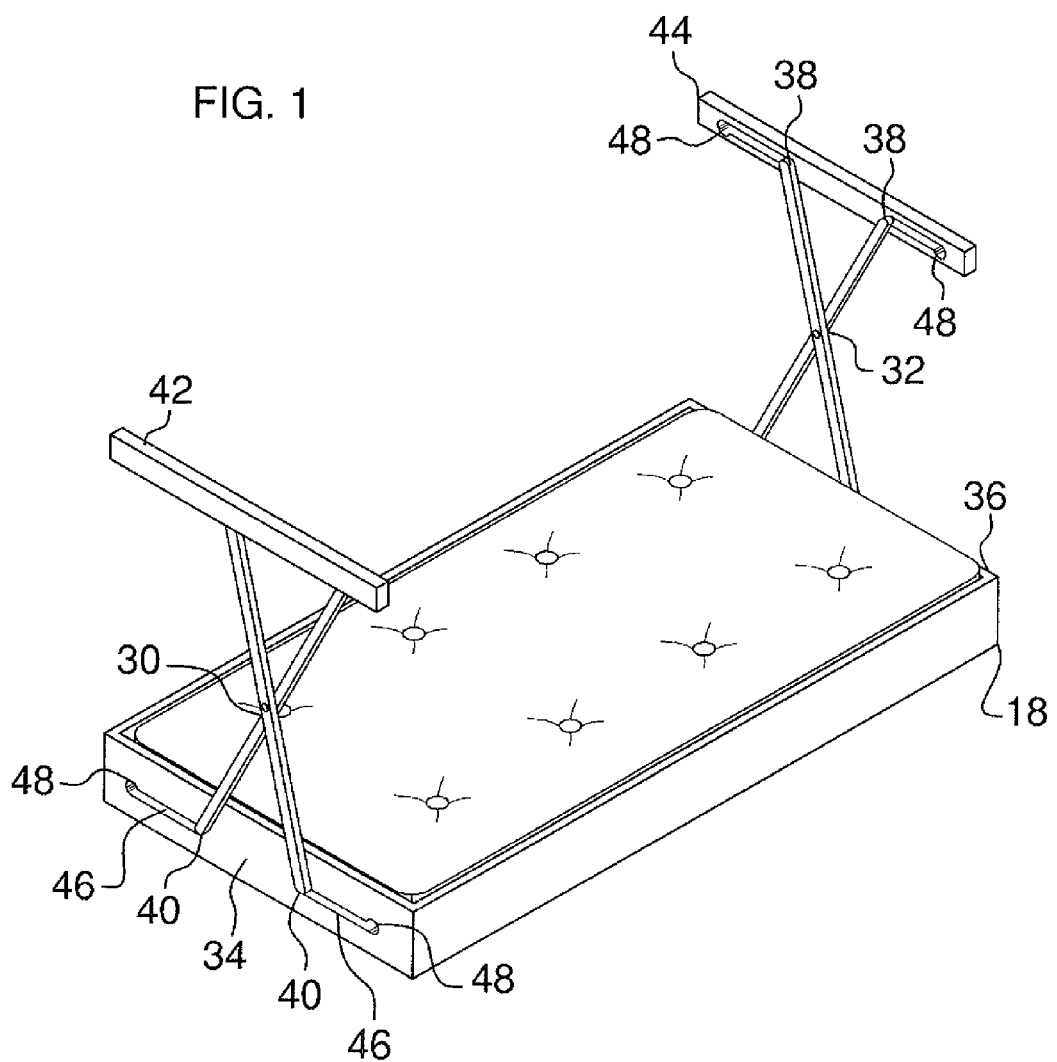
FIG. 1 is a perspective view of a tractor cab bed apparatus according to the present invention.
Figure 2:
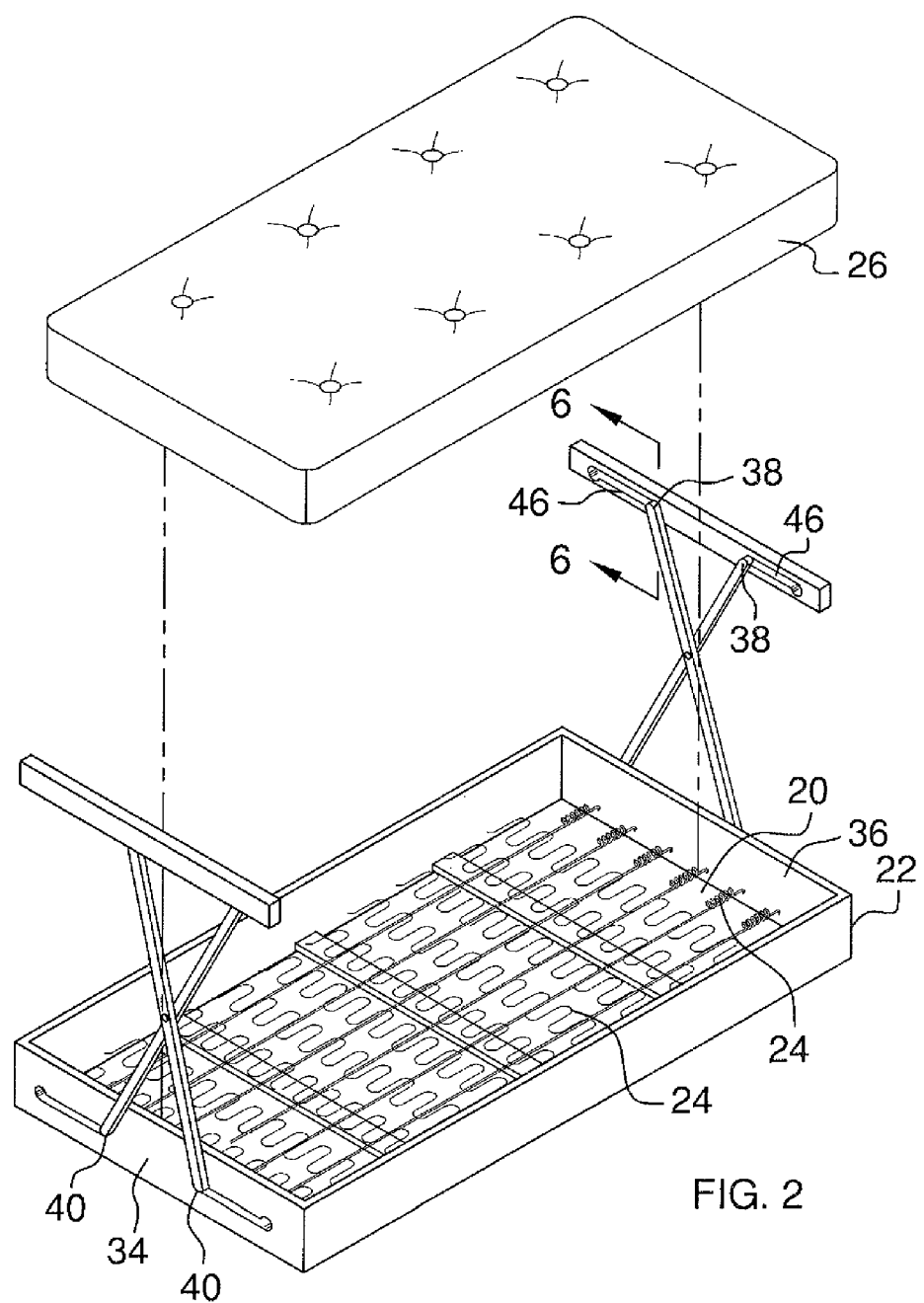
FIG. 2 is an expanded perspective view of the present invention.
Figure 3:
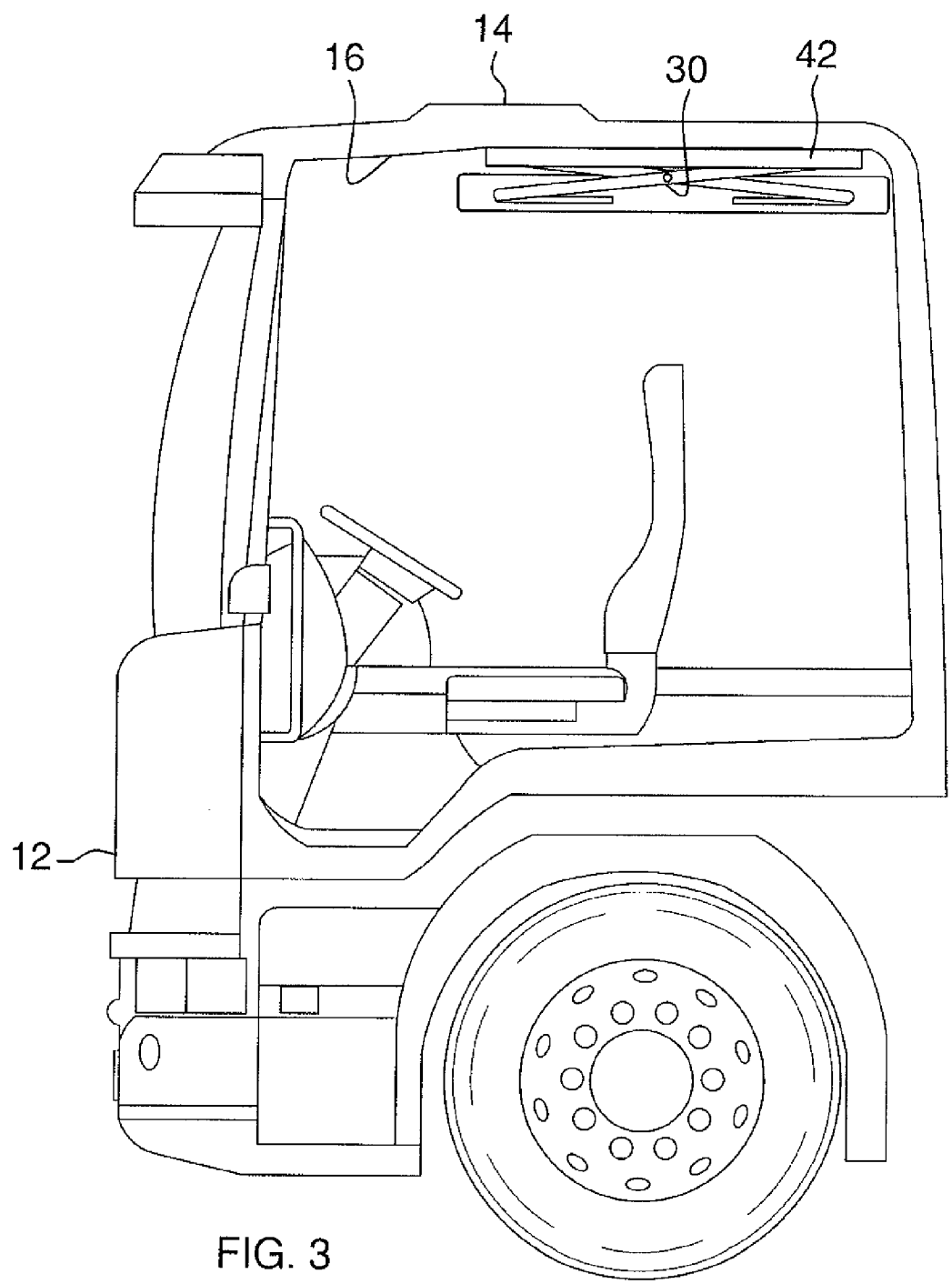
FIG. 3 is a side view of the present invention in a stored position.
Figure 4:
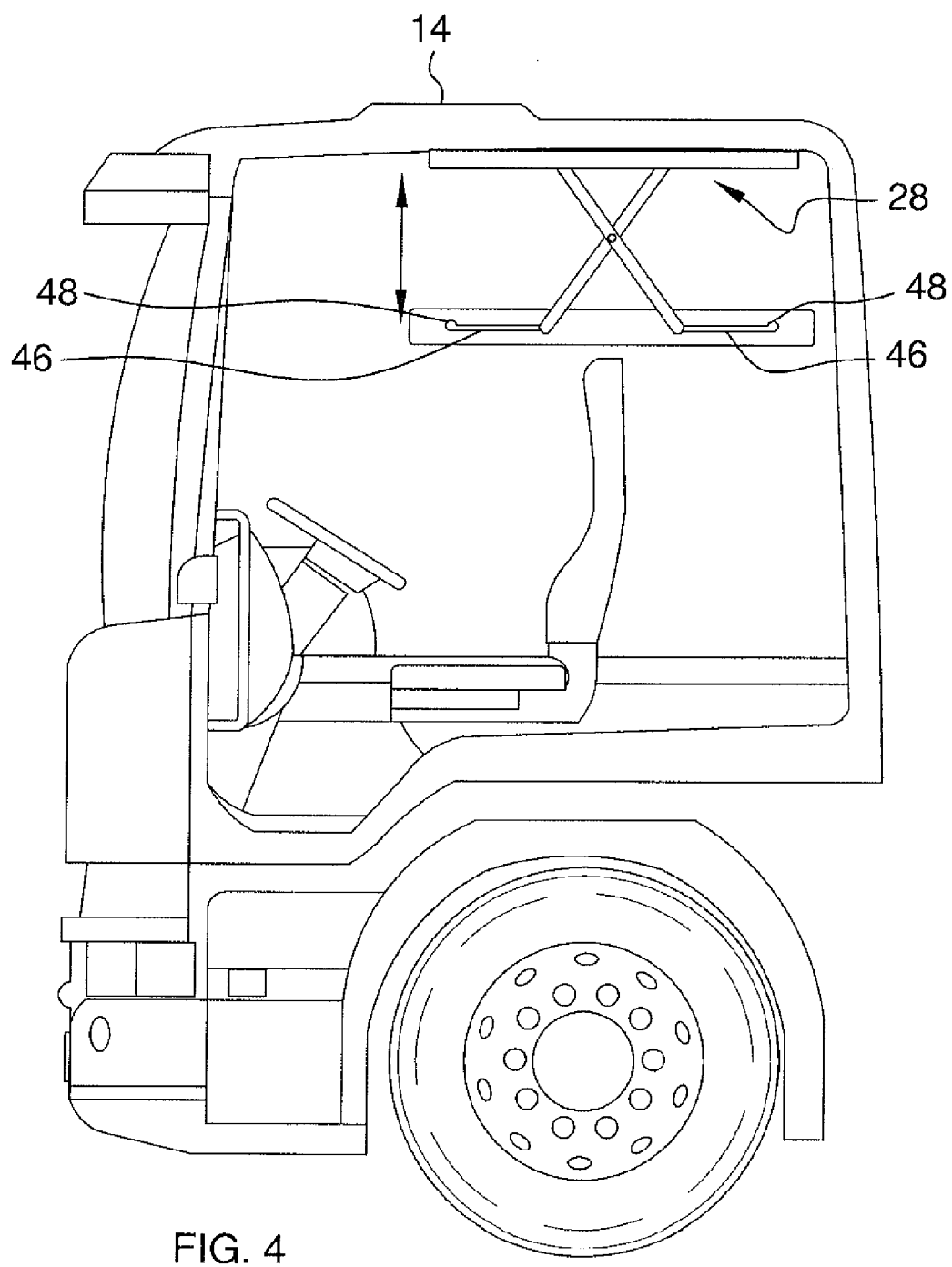
FIG. 4 is a side view in a deployed of the present invention.
Figure 5:
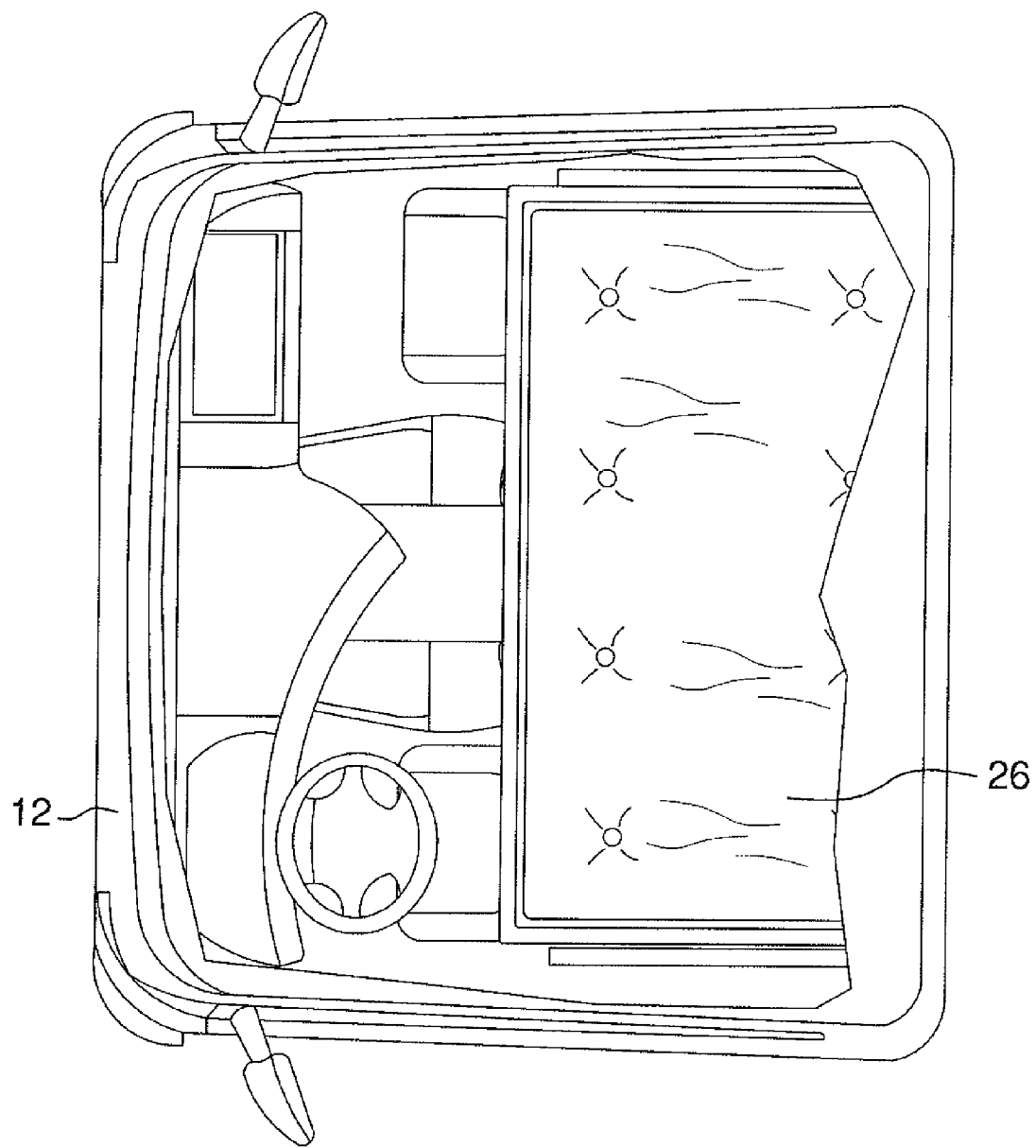
FIG. 5 is a top view of the present invention.
Figure 6:
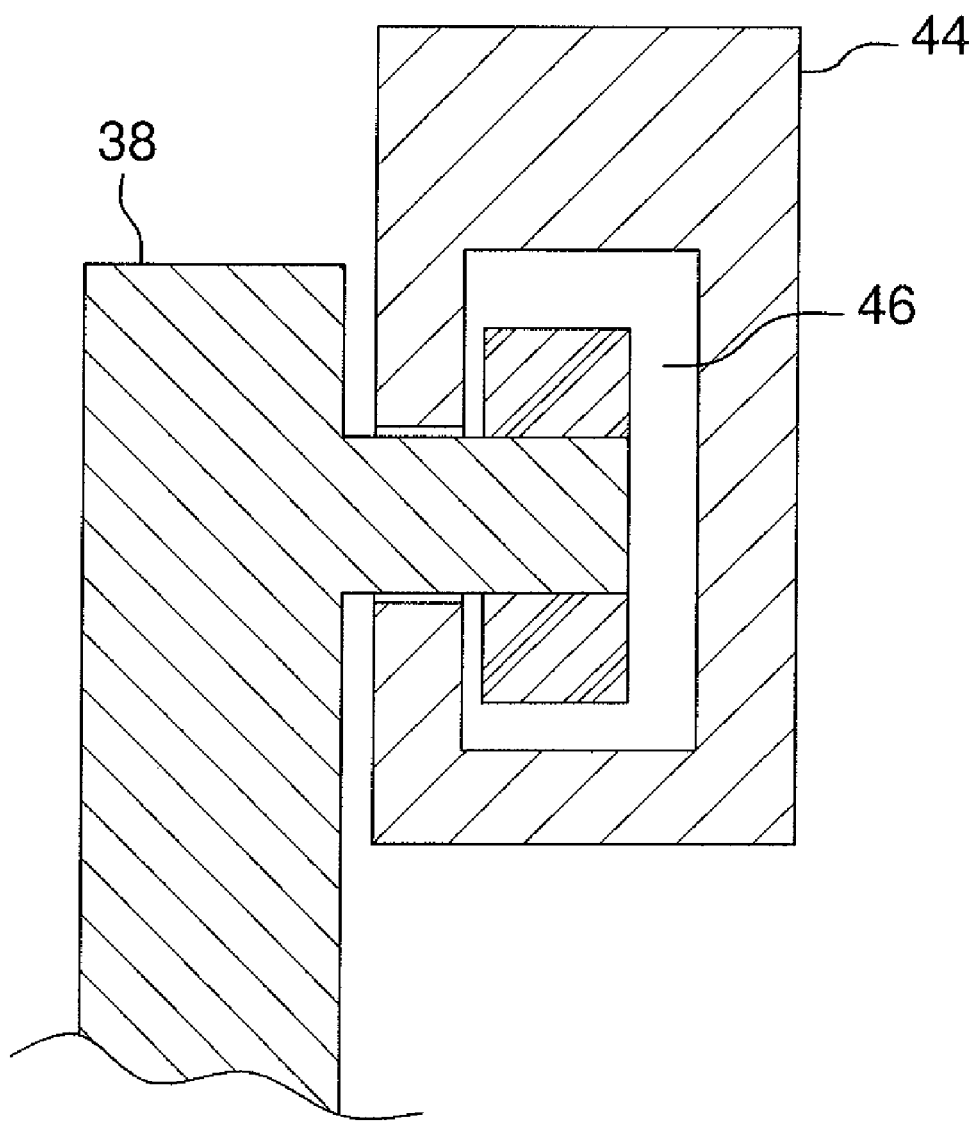
FIG. 6 is a cross-sectional view taken along line 6-6 of FIG. 2 of the present invention.

With reference now to the drawings, and in particular to FIGS. 1 through 6 thereof, a new bed device embodying the principles and concepts of the present invention and generally designated by the reference numeral 10 will be described.

As best illustrated in FIGS. 1 through 6, the tractor cab bed apparatus 10 generally comprises a conventional tractor cab 12 that has a roof 14 having a bottom surface 16. A housing 18 is provided that includes a bottom wall 20 and a peripheral wall 22 that is attached to and extends upwardly from the bottom wall 20. The peripheral wall 22 has height less than one foot. A plurality of springs 24 may be mounted in said housing 16 and traverse the bottom wall 20. A mattress 26 is positioned in the housing 16 and on the springs 24 if they are used. The peripheral wall 22 extends around the mattress.

A support assembly 28 is attached to the housing 18 and secures the housing 18 to the bottom surface 16 of the roof 14. The support assembly 28 is collapsible to position the housing 18 in a stored position adjacent to the roof 14 or in a deployed position with the housing 18 spaced from the bottom surface 16. The support assembly 28 includes a first set of arms 30 and a second set of arms 32. Each of the sets of arms 30, 32 includes a pair of arms pivotally coupled together to form an X-shape. The housing 18 includes a first end wall 34 and a second end wall 36. Each of the arms 30, 32 has an upper end 38 and a bottom end 40. The bottom ends 40 of the first set of arms 30 are slidably attached to the first end wall 34. Each of the bottom ends 40 of the second set of arms 32 is slidably attached to the the second end wall 36.

The support assembly 28 further includes a first elongated member 42 and a second elongated member 44. Each of the first 42 and second 44 elongated members is attached to the bottom side 16 of the roof 14 in a conventional manner such as with an adhesive cement material, brackets or bolts. The first 42 and second 44 elongated members are orientated parallel to each other and spaced from each other. The top ends 38 of the first set of arms 30 is slidably attached to the first elongated member 42 and the top ends 38 of the second set of arms 32 is slidably coupled to the second elongated member 44. Each of the top ends 38 is slidably mounted to slots 46 in an associated one of the first and second elongated members. The bottom ends 40 are each slidably mounted to slots 46 in an associated one of the first 34 and second 36 end walls. Each of the slots 46 has a catch 48 therein to releasably secure the first 30 and second 32 set of arms in the stored position. If slots 46 are not used, any conventional locking system may be used to hold the apparatus 10 in the stored position. Alternatively, biasing members such as springs may be used to hold the apparatus 10 in the stored position when no additional weight is placed on the housing 18. Further, an electric motor may be used to selectively lower or lift the housing 18.

In use, the housing 18 is retained in the stored position when not in use. When a driver of the cab 12 desires to use the mattress 26, the arms 30, 32 are dislodges from the catches 48 and the housing 18 is moved from the stored position to the deployed position. This allows a user of a cab 12, which is not a sleeper cab, to sleep within the cab 12.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A bed system comprising:
    a tractor cab having a roof having a bottom surface;
    a housing including a bottom wall and a peripheral wall being attached to and extending upwardly from said bottom wall;
    a mattress being positioned in said housing, said peripheral wall extending around said mattress; and
    a support assembly being attached to said housing and securing said housing to said bottom surface of said roof, said support assembly being collapsible to position said housing in a stored position adjacent to said roof or in a deployed position having said housing spaced from said bottom surface.

2. The bed system according to claim 1, wherein said peripheral wall has height less than one foot.

3. The bed system according to claim 1, wherein said support assembly includes:
    a first set of arms and a second set of arms, each of said sets of arms including a pair of arms being pivotally coupled together to form an X-shape, said housing including a first end wall and a second end wall, each of said arms having an upper end and a bottom end, each of said bottom ends of said first set of arms being slidably attached to said first end wall, each of said bottom ends of said second set of arms being slidably attached to said second end wall; and
    a first elongated member and a second elongated member, each of said first and second elongated members being attached to said bottom surface of said roof, said first and second elongated members being orientated parallel to each other and spaced from each other, said top ends of said first set of arms being slidably attached to said first elongated member, said top ends of said second set of arms being slidably coupled to said second elongated member.

4. The bed system according to claim 3, wherein each of said top ends are slidably mounted to slots in an associated one of said first and second elongated members, each of said bottom ends being slidably mounted in slots in an associated one of said first and second end walls, each of said slots having a catch therein to releasably secure said first and second sets of arms in said stored position.

* * * * *